(12) United States Patent
Gao

(10) Patent No.: US 11,256,007 B2
(45) Date of Patent: Feb. 22, 2022

(54) OPTICAL BRIGHTENING STRUCTURE, PREPARATION METHOD THEREFOR, AND ELECTRONIC DEVICE

(71) Applicant: BOE TECHNOLOGY GROUP CO., LTD., Beijing (CN)

(72) Inventor: Xinwei Gao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 504 days.

(21) Appl. No.: 16/321,178

(22) PCT Filed: Apr. 26, 2018

(86) PCT No.: PCT/CN2018/084544
§ 371 (c)(1),
(2) Date: Jan. 28, 2019

(87) PCT Pub. No.: WO2018/205836
PCT Pub. Date: Nov. 15, 2018

(65) Prior Publication Data
US 2021/0311228 A1 Oct. 7, 2021

(30) Foreign Application Priority Data
May 8, 2017 (CN) .................. 201710318184.X

(51) Int. Cl.
*G02B 5/02* (2006.01)
*B29D 11/00* (2006.01)

(52) U.S. Cl.
CPC ........ *G02B 5/0215* (2013.01); *B29D 11/0074* (2013.01); *G02B 5/0268* (2013.01)

(58) Field of Classification Search
CPC ...... G02B 5/0215; G02B 5/0268; G02B 1/10; G02B 1/12; G02B 3/0006; G02B 3/0012;
(Continued)

(56) References Cited

U.S. PATENT DOCUMENTS

2005/0276949 A1 12/2005 Bourdelais et al.
2008/0304278 A1 12/2008 Chiang et al.
(Continued)

FOREIGN PATENT DOCUMENTS

CN          1969222 A      5/2007
CN        201993481 U      9/2011
(Continued)

OTHER PUBLICATIONS

First Chinese Office Action dated Sep. 19, 2018.
International Search Report and Written Opinion dated Jul. 20, 2018.

*Primary Examiner* — Arnel C Lavarias
(74) *Attorney, Agent, or Firm* — Dilworth & Barrese, LLP.; Michael J. Musella, Esq.

(57) ABSTRACT

An optical brightness enhancement structure and a manufacturing method thereof and an electronic device are provided. The method for manufacturing an optical brightness enhancement structure includes: providing a light-transmissive carrier, and forming a buffer layer on a first surface of the light-transmissive carrier; forming a plurality of microstructures for converging light on a surface of the buffer layer away from the light-transmissive carrier; and surface energy of each of the microstructures is greater than surface energy of the buffer layer.

20 Claims, 5 Drawing Sheets

(58) Field of Classification Search
CPC .......... G02B 2003/0093; G02B 5/0226; G02B 27/0938; G02B 27/0961; G02B 27/1073; G02B 27/12; G02B 27/123; B29D 11/0074; B29D 11/00798
USPC ....... 359/599, 601, 609, 613, 618, 619, 620, 359/626, 628
See application file for complete search history.

(56) References Cited

U.S. PATENT DOCUMENTS

| | | | | |
|---|---|---|---|---|
| 2010/0239789 | A1* | 9/2010 | Umeda | G02B 5/0215 428/1.33 |
| 2011/0111118 | A1* | 5/2011 | Schmitt-Lewen | B41M 7/02 427/145 |
| 2011/0311764 | A1* | 12/2011 | Hulseman | C04B 35/119 428/131 |
| 2012/0206805 | A1* | 8/2012 | Meng | G02B 5/008 359/487.03 |
| 2015/0375997 | A1* | 12/2015 | Chu | H01L 23/427 428/149 |
| 2017/0218230 | A1* | 8/2017 | Studer | B05D 5/10 |

FOREIGN PATENT DOCUMENTS

| | | |
|---|---|---|
| CN | 202267753 U | 6/2012 |
| CN | 102565895 A | 7/2012 |
| CN | 104129072 A | 11/2014 |
| CN | 104570172 A | 4/2015 |
| CN | 104678466 A | 6/2015 |
| CN | 105093367 A | 11/2015 |
| CN | 106932846 A | 7/2017 |
| KR | 1020150062089 A | 6/2015 |

* cited by examiner electronic device
100 optical brightness
enhancement structure
10

FIG. 9

OPTICAL BRIGHTENING STRUCTURE, PREPARATION METHOD THEREFOR, AND ELECTRONIC DEVICE

CROSS REFERENCE TO RELATED APPLICATION

The present application claims the priority of Chinese patent application No. 201710318184.X, filed on May 8, 2017, and the entire content disclosed by the Chinese patent application is incorporated herein by reference as part of the present application.

TECHNICAL FIELD

Embodiments of the present disclosure relate to an optical brightness enhancement structure and a manufacturing method thereof, and an electronic device.

BACKGROUND

Brightness enhancement film (BEF), also known as a prism sheet, is widely applied in a backlight module because it can converge emergent light from a light source, and improve a luminous efficiency of the light source.

SUMMARY

At least one embodiment of the present disclosure provides a method for manufacturing an optical brightness enhancement structure, comprising: providing a light-transmissive carrier, and forming a buffer layer on a first surface of the light-transmissive carrier; forming a plurality of microstructures for converging light on a surface of the buffer layer away from the light-transmissive carrier; wherein surface energy of each of the microstructures is greater than surface energy of the buffer layer.

For example, in a method for manufacturing an optical brightness enhancement structure, forming the plurality of microstructures for converging light on the surface of the buffer layer away from the light-transmissive carrier comprises: forming a plurality of liquid microstructures on the surface of the buffer layer away from the light-transmissive carrier by a printing process or a coating process; and curing the plurality of liquid microstructures to obtain the plurality of microstructures.

For example, in a method for manufacturing an optical brightness enhancement structure, a material of the microstructures comprises a thermal curing material or an ultraviolet curing material; when the material of the microstructures is the thermal curing material, curing the plurality of liquid microstructures comprises: curing the plurality of liquid microstructures by a thermal curing process; or when the material of the microstructures is the ultraviolet curing material, curing the plurality of liquid microstructures comprises: curing the plurality of liquid microstructures by an ultraviolet curing process.

For example, in a method for manufacturing an optical brightness enhancement structure, a contact angle of each of the microstructures with a surface of the buffer layer is greater than 10 degrees.

For example, in a method for manufacturing an optical brightness enhancement structure, the plurality of microstructures comprise a plurality of raised structures, and the plurality of raised structures are arranged consecutively or spaced apart.

For example, in a method for manufacturing an optical brightness enhancement structure, the plurality of raised structures are arranged regularly.

For example, in a method for manufacturing an optical brightness enhancement structure, the raised structures each comprise a hemispheroidal structure or a semi-cylindrical structure.

For example, in a method for manufacturing an optical brightness enhancement structure, forming the buffer layer on the first surface of the light-transmissive carrier comprises: forming the buffer layer on the first surface of the light-transmissive carrier by a printing process, a coating process or a chemical vapor deposition process.

For example, a method for manufacturing an optical brightness enhancement structure further comprising: forming an optical adhesive layer on a second surface of the light-transmissive carrier; and forming an adhesive protective film on a surface of the optical adhesive layer away from the light-transmissive carrier.

For example, in a method for manufacturing an optical brightness enhancement structure, a viscosity of a material of the microstructures is less than 800 centipoise.

For example, in a method for manufacturing an optical brightness enhancement structure, a material of the buffer layer comprises an organic material or an inorganic material.

For example, in a method for manufacturing an optical brightness enhancement structure, the printing process comprises an inkjet printing process or a nozzle printing process, and the coating process comprises a slit coating process, a spray coating process or a dispensing process.

For example, in a method for manufacturing an optical brightness enhancement structure, the buffer layer has a thickness of 10 nanometer to 1 millimeter, and the microstructures each have a thickness of 100 nanometer to 100 millimeter.

At least one embodiment of the present disclosure provides an optical brightness enhancement structure, comprising: a light-transmissive carrier, and a buffer layer, on a first surface of the light-transmissive carrier, wherein a plurality of microstructures for converging light are on a surface of the buffer layer away from the light-transmissive carrier, and surface energy of each of the microstructures is greater than surface energy of the buffer layer.

For example, in an optical brightness enhancement structure, a contact angle of each of the microstructures with a surface of the buffer layer is greater than 10 degrees.

For example, in an optical brightness enhancement structure, the plurality of microstructures comprise a plurality of raised structures, and the plurality of raised structure are arranged consecutively or spaced apart.

For example, in an optical brightness enhancement structure, the plurality of raised structures are arranged regularly.

For example, in an optical brightness enhancement structure, the raised structures each comprise a hemispheroidal structure or a semi-cylindrical structure.

For example, an optical brightness enhancement structure further comprising: an optical adhesive layer, on a second surface of the light-transmissive carrier, and an adhesive protective film, on a surface of the optical adhesive layer away from the light-transmissive carrier.

At least one embodiment of the present disclosure provides an electronic device, comprising the optical brightness enhancement structure according to any embodiment of the present disclosure.

BRIEF DESCRIPTION OF THE DRAWINGS

In order to demonstrate clearly technical solutions of the embodiments of the present disclosure, the accompanying drawings in relevant embodiments of the present disclosure will be introduced briefly. It is apparent that the drawings may only relate to some embodiments of the disclosure and not intended to limit the present disclosure.

FIG. 9 is a schematic diagram of an electronic device according to some embodiments of the present disclosure.

Figure 1:
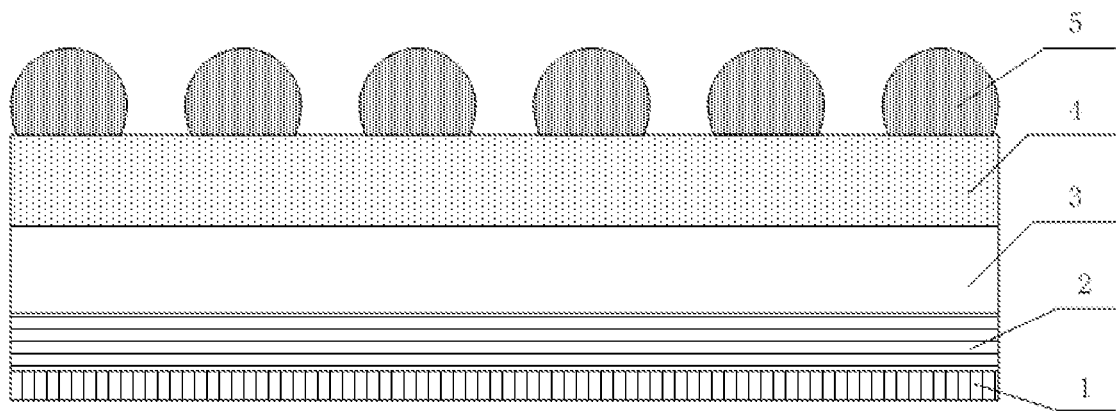
FIG. 1 is a section schematic diagram of an optical brightness enhancement structure according to some embodiments of the present disclosure.

| Reference number: | |
|---|---|
| 1-adhesive protective film; | 2-optical adhesive layer; |
| 3-light-transmissive carrier; | 4-buffer layer; |
| 5-microstructure; | 6-raised structure; |
| 10-optical brightness enhancement structure; | 100-electronic device |

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is apparent that the described embodiments are just a part but not all of the embodiments of the disclosure. Based on the described embodiments herein, those skilled in the art can obtain other embodiment, without any creative work, which shall be within the scope of the disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly. The terms, "on," "under," "left," "right," or the like are only used to indicate relative position relationship, and when the position of the object which is described is changed, the relative position relationship may be changed accordingly.

A traditional brightness enhancement film is formed by arranging a plurality of identical elongated light-gathering prisms regularly in a specific direction, and each light-gathering prism has a cross section with a shape of an isoceles triangle. In a process of manufacturing such the traditional brightness enhancement film, it needs to etch a corresponding light-gathering prism on a substrate one by one according to a set prism angle and a prism length, so as to form the brightness enhancement film; or it needs to manufacture a plurality of independent light-gathering prisms in advance according to a set prism angle and a prism length, and then adhere the plurality of light-gathering prisms at the corresponding position of the substrate in a specific direction, so as to form the brightness enhancement film.

No matter which method is used to manufacture the brightness enhancement film, because there is a high demand on the shape of the light-gathering prism in the brightness enhancement film, the etching or processing of the light-gathering prism needs to have a relatively high precision, which inevitably leads to repeated detections and corrections on an etching angle or a processing angle of the light-gathering prism, and adjustments on orientation of each light-gathering prism to be aligned, thereby complicating the manufacturing process of the brightness enhancement film.

At least one embodiment of the present disclosure provides a method for manufacturing an optical brightness enhancement structure, including: providing a light-transmissive carrier, and forming a buffer layer on a first surface of the light-transmissive carrier; and forming a plurality of microstructures for converging light on a surface of the buffer layer away from the light-transmissive carrier. Surface energy of the microstructure is greater than surface energy of the buffer layer.

At least one embodiment of the present disclosure further provides an optical brightness enhancement structure corresponding to the above-mentioned method.

The method for manufacturing an optical brightness enhancement structure according to the embodiments of the present disclosure can simplify the manufacturing process of the optical brightness enhancement structure, thereby saving processing costs and time costs.

The embodiment of the present disclosure will be described below in detail with reference to the accompanying drawings.

Figure 2:
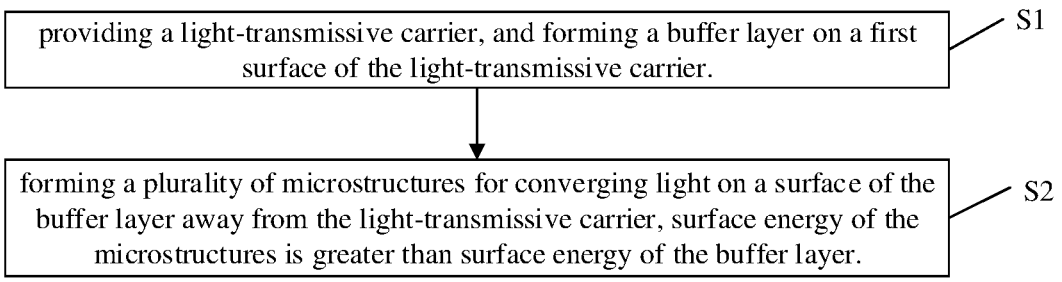
FIG. 2 is a flow chart of a method for manufacturing an optical brightness enhancement structure according to some embodiments of the present disclosure.

Some embodiments of the present disclosure provide a method for manufacturing an optical brightness enhancement structure, as shown in FIG. 1 and FIG. 2, the method including the following operations.

In step S1: providing a light-transmissive carrier 3, and forming a buffer layer 4 on a first surface of the light-transmissive carrier.

In step S2: forming a plurality of microstructures 5 for converging light on a surface of the buffer layer 4 away from the light-transmissive carrier 3. Surface energy of the microstructures 5 is greater than surface energy of the buffer layer 4.

In the embodiments of the present disclosure, a material having smaller surface energy is used to form the buffer layer on the first surface of the light-transmissive carrier, and a material having larger surface energy is used to form a plurality of microstructures on the surface of the buffer layer away from the light-transmissive carrier. The surface energy of the microstructure is greater than the surface energy of the buffer layer, so that the microstructure has enough surface tension on the buffer layer, and the microstructure is easily manufactured and shaped, thereby ensuring that the microstructure can be stably formed on the surface of the buffer layer, and obtaining the optical brightness enhancement structure satisfying a light-gathering requirement of emergent light from the light source.

Compared with the etching or processing of the light-gathering prisms forming the brightness enhancement film, the method for manufacturing an optical brightness enhancement structure provided by the embodiments of the present disclosure forms the buffer layer on the light-transmissive carrier and forms the plurality of microstructures on the surface of the buffer layer away from the light-transmissive carrier respectively by selecting materials with different surface energy. Thereby the optical brightness enhancement structure can realize a light-gathering effect of light from a light source through the plurality of microstructures without additional processes such as detection, correction, etc. Thereby simplifying the manufacturing process of the optical brightness enhancement structure and saving processing costs and time costs.

Figure 3:
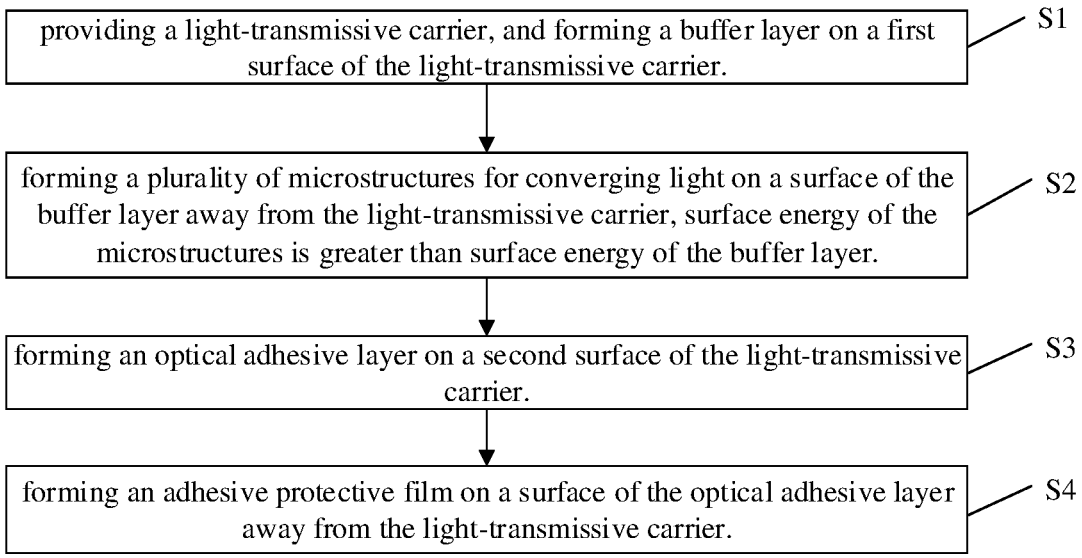
FIG. 3 is a flow chart of another method for manufacturing an optical brightness enhancement structure according to some embodiments of the present disclosure.

In order to conveniently assemble the optical brightness enhancement structure, on the basis of the above-mentioned embodiments, as shown in FIG. 1 and FIG. 3, the method for manufacturing the optical brightness enhancement structure can further include the following operations.

In step S3: forming an optical adhesive layer 2 on a second surface of the light-transmissive carrier 3.

In step S4: forming an adhesive protective film 1 on a surface of the optical adhesive layer 2 away from the light-transmissive carrier 3.

For example, the optical adhesive layer 2 can be formed by optically clear adhesive (OCA), so as to ensure the optical adhesive layer has a relatively high light transmissivity and good adhesive strength. The adhesive protective film 1 can be formed by for example, Polyethylene terephthalate (PET), to protect the optical adhesive layer 2 from external pollution. The optical brightness enhancement structure obtained by the method according to the present embodiment can be conveniently assembled in a backlight module or other optical device requiring the optical brightness enhancement. Specifically, when the optical brightness enhancement structure needs to be assembled, the adhesive protective film 1 is torn off, the optical adhesive layer 2 of the optical brightness enhancement structure is aligned with its assembled position; with the adhesive property of the optical adhesive layer 2, the optical brightness enhancement structure is adhered in the backlight module or other optical device requiring optical brightness enhancement. In this way, the optical brightness enhancement structure can be assembled more conveniently, thereby improving a assembled efficiency of the optical brightness enhancement structure.

In the method for manufacturing the optical brightness enhancement structure according to the embodiment of the present disclosure, the light-transmissive carrier can be made of a light-transmissive resin, for example, polyethylene terephthalate (PET), polybutylene terephthalate (PBT), or polybutylene naphthalate (PBN), such that there are many ways to form the buffer layer on one surface of the light-transmissive carrier.

In order to accurately control a forming position of the buffer layer and forming structure of the buffer layer, in some embodiments of the present disclosure, forming the buffer layer on the first surface of the light-transmissive carrier can includes: forming the buffer layer on the first surface of the light-transmissive carrier by a printing process, a coating process or a chemical vapor deposition process.

For example, in the embodiments of the present disclosure, the buffer layer can be made of an organic material, for example, an light-transmissive macromolecule organic compound with a synthetic resin as a basic component, for example, polymethyl methacrylate, polystyrene, organic silicon material, or the like; for example, the buffer layer can also be made of an inorganic material, such as $SiN_x$, $SiON_x$, or the like.

Figure 4:
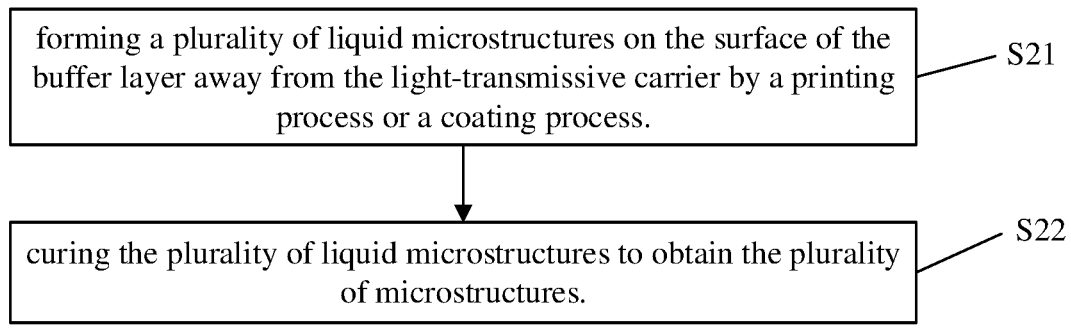
FIG. 4 is a flow chart of a method for manufacturing a microstructure in the method for manufacturing an optical brightness enhancement structure according to some embodiments of the present disclosure.

In the method for manufacturing the optical brightness enhancement structure according to the embodiment of the present disclosure, there are many ways to form the microstructures on the buffer layer. In order to form a plurality of microstructures on the buffer layer conveniently, as shown in FIG. 4, in some embodiments of the present disclosure, the above-mentioned step S2 can include the following operations.

In step S21: forming a plurality of liquid microstructures on the surface of the buffer layer away from the light-transmissive carrier by a printing process or a coating process.

In step S22: curing the plurality of liquid microstructures to obtain the plurality of microstructures.

In the method for manufacturing the optical brightness enhancement structure according to the embodiments of the present disclosure, when the plurality of liquid microstructures are formed on the surface of the buffer layer away from the light-transmissive carrier by the printing process or the coating process, the forming positions and the structural shapes of the liquid microstructures can be controlled accurately using the printing accuracy of the printing process or the coating accuracy of the coating process, thereby ensuring that the obtained microstructures can satisfy various requirements of the optical brightness enhancement structure on the microstructures after the liquid microstructures are cured. Moreover, compared with the light-gathering prism in which the brightness enhancement film is obtained by etching or processing, in the embodiments of the present disclosure, after the liquid microstructures are formed by the printing process or the coating process, the microstructures for converging light can be obtained by curing the liquid microstructures. The preparation process is simple, and the process for manufacturing the microstructures for converging light in the optical brightness enhancement structure can be simplified. In addition, when the optical brightness enhancement structures are produced in batch, the microstructures are formed by the printing process or the coating process, and the production costs can be reduced.

For example, in some embodiments of the present disclosure, a contact angle of each of the microstructures with a surface of the buffer layer is greater than 10 degrees.

It should be noted that FIG. 5, FIG. 6, FIG. 7 and FIG. 8 are top schematic diagrams of the optical brightness enhancement structure obtained by the method according to the embodiments of the present disclosure.

Figure 5:
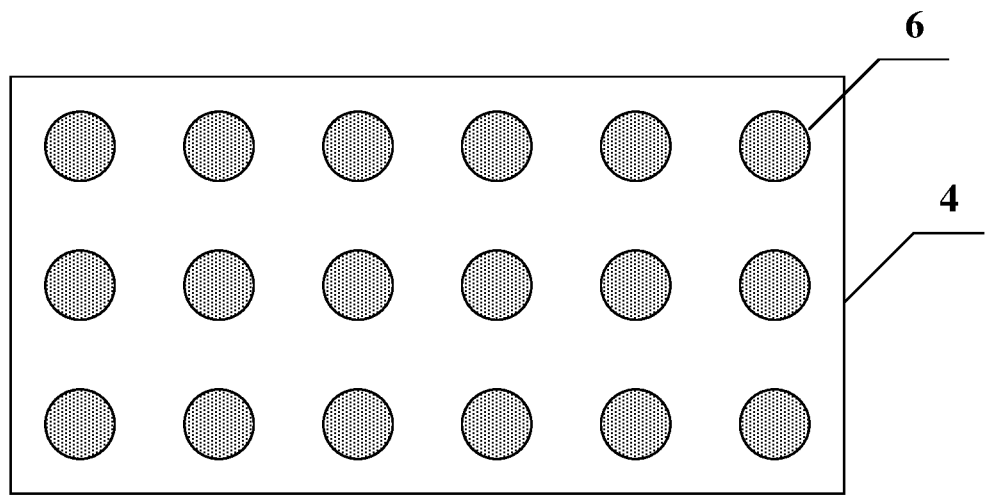
FIG. 5 is a top schematic diagram of an optical brightness enhancement structure according to some embodiments of the present disclosure.
Figure 7:
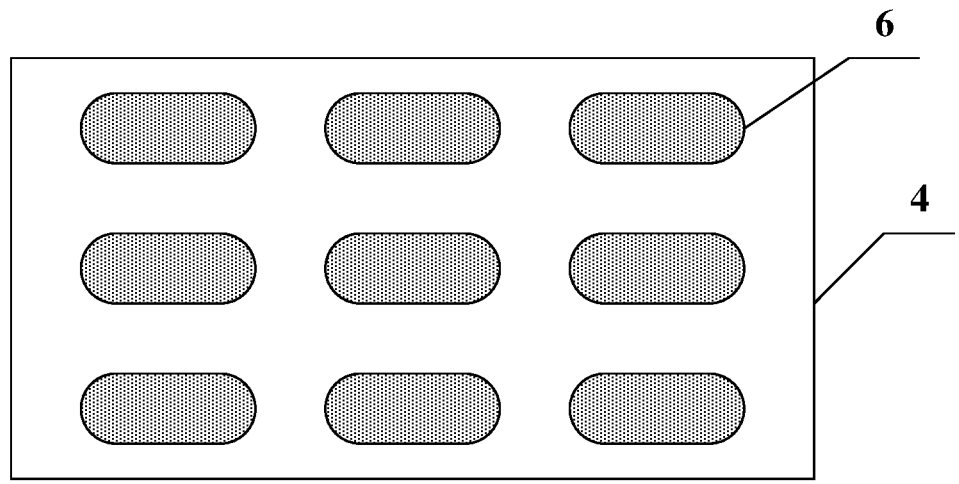
FIG. 7 is a top schematic diagram of yet another optical brightness enhancement structure according to some embodiments of the present disclosure.
Figure 8:
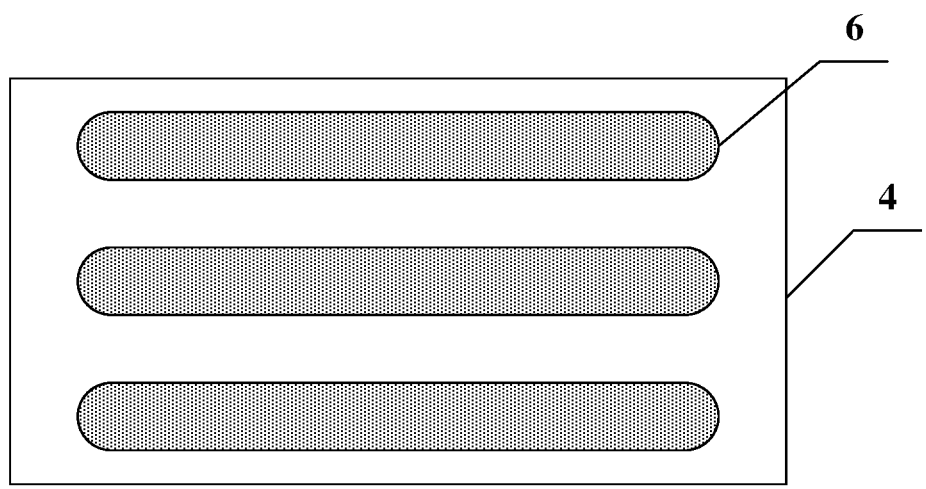
FIG. 8 is a top schematic diagram of yet another optical brightness enhancement structure according to some embodiments of the present disclosure.

For example, in some embodiments of the present disclosure, the plurality of microstructures include a plurality of raised structures, and the plurality of raised structures are arranged consecutively or spaced apart. For example, as shown in FIG. 5, FIG. 7 and FIG. 8, the plurality of raised structures 6 are arranged consecutively on the buffer layer 4 with a same distance between each other. For another example, as shown in FIG. 6, the plurality of raised structures 6 can also be spaced apart on the buffer layer 4, that is, the interval can be unequal.

For example, in some embodiments of the present disclosure, the plurality of raised structures are arranged regularly. For example, as shown in FIG. 5, FIG. 6, FIG. 7 and FIG. 8, the plurality of raised structures 6 are arranged regularly on the buffer layer in a specific direction, thereby converging light from a light source by the optical brightness enhancement structure. It should be noted that besides the arrangements as shown in FIG. 5, FIG. 6, FIG. 7 and FIG. 8, the raised structures can also be arranged regularly in other ways, and the arrangements are not limited in the embodiments of the present disclosure. In addition, in FIG. 5, FIG. 6, FIG. 7, and FIG. 8, the number of the raised structures 6 is merely schematic, and is not limited herein.

In the embodiments of the present disclosure, the specific shape of the raised structures can be set according to a required degree of optical brightness enhancement, the forming process of the microstructures, and the like, so as to improve the luminous efficiency of the light source.

Figure 6:
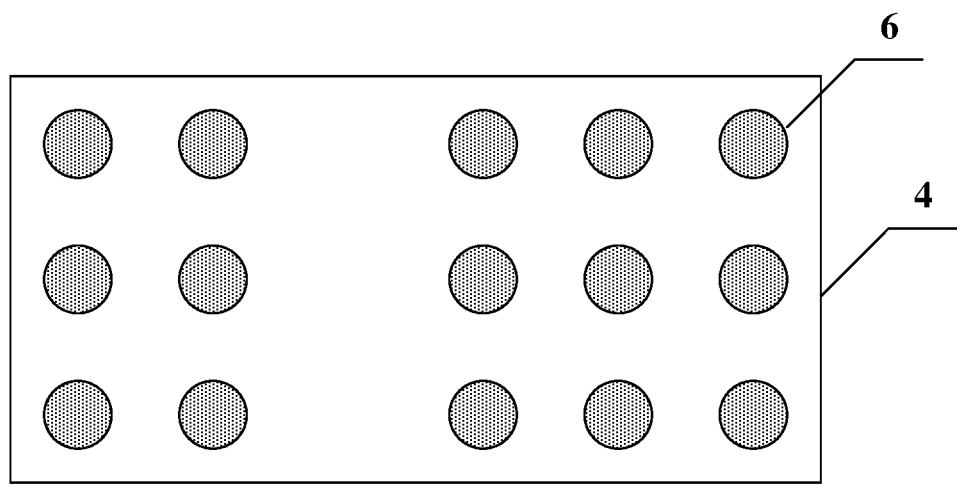
FIG. 6 is a top schematic diagram of another optical brightness enhancement structure according to some embodiments of the present disclosure.

For example, in some embodiments, as shown in FIG. 5 and FIG. 6, the raised structures 6 each can be a hemispheroidal structure. For example, in another embodiment, as shown in FIG. 7 and FIG. 8, the raised structures 6 each can also be a semi-cylindrical structure.

In the embodiments of the present disclosure, the raised structures each adopt the hemispheroidal structure or the semi-cylindrical structure, which is not only convenient for manufacturing the microstructures by the printing process or the coating process; meanwhile, compared with an edge of the light-gathering prism in contact with a foreign object, when an arc surface of the hemispheroidal structure or an arc surface of the semi-cylindrical structure is in contact with a foreign object, the hemispheroidal structure or the semi-cylindrical structure according to present embodiment bears a relatively small stress due to contact, and does not tend to be damaged when there is a contact. Compared with the light-gathering prism, the microstructures according to the embodiments of the present disclosure can avoid a problem of easy damage when there is a contact with the foreign object, and contributes to stabling the optical performance of the microstructures.

Because a thermal environment or an ultraviolet environment is easily obtained, in some embodiments of the present disclosure, a material of the microstructures comprises a thermal curing material or an ultraviolet curing material. For example, when the material of the microstructures is the thermal curing material, curing the plurality of liquid microstructures includes: curing the plurality of liquid microstructures by a thermal curing process. For example, when the material of the microstructures is the ultraviolet curing material, curing the plurality of liquid microstructures includes: curing the plurality of liquid microstructures by an ultraviolet curing process.

In the embodiments of the present disclosure, after the microstructures are made of the thermal curing material or the ultraviolet curing material, the liquid microstructures can be cured rapidly by using the corresponding thermal curing environment or the corresponding ultraviolet curing environment, which is advantageous for increasing a shaping rate of the optical brightness enhancement structure, and thereby increasing the production efficiency of the optical brightness enhancement structure.

In the embodiments of the present disclosure, the printing process includes an ink-jet printing process, a nozzle printing process, or the like. The coating process includes a slit coating process, a spray coating process, a dispensing process, or the like. Those skilled in the art can correspondingly select different types of printing processes or coating processes according to a complexity and a manufacture accuracy of the microstructures or the buffer layer. For example, when the shape of the microstructures is relatively complicated and a relatively high manufacture accuracy is required, the ink-jet printing process can be selected, and the microstructures can be formed on the buffer layer accurately. For example, when the shape of the microstructures is relatively complicated, but its accuracy requirement is not high, the nozzle printing process can be selected to complete the manufacture of the microstructures on the buffer layer.

For example, in some embodiments of the present disclosure, a viscosity of a material of the microstructures is less than 800 centipoise, thereby ensuring that the microstructures are stably formed on the buffer layer when the printing process or the coating process is used to manufacture the microstructures, so as to smoothly complete the manufacture of the microstructures.

In the embodiments of the present disclosure, the buffer layer and the microstructures can both be formed by the printing process or the coating process. In order to conveniently implement the printing process or the coating process, a thickness of the buffer layer and a thickness of the microstructures need to be limited. For example, in some embodiments, the buffer layer has a thickness of 10 nanometer to 1 millimeter, and the microstructures each have a thickness of 100 nanometer to 100 millimeter.

The embodiments of the present disclosure further provide an optical brightness enhancement structure which can be manufactured by the method for manufacturing the optical brightness enhancement structure according to the embodiments of the present disclosure. As shown in FIG. 1, the optical brightness enhancement structure includes a light-transmissive carrier 3 and a buffer layer 4 on a first surface of the light-transmissive carrier 3. A plurality of microstructures 5 for converging light are on a surface of the buffer layer 4 away from the light-transmissive carrier 3, and surface energy of each of the microstructures 5 is greater than surface energy of the buffer layer 4.

The optical brightness enhancement structure according to the embodiment of the present disclosure can realize the same beneficial effects as the method for manufacturing the optical brightness enhancement structure according to the embodiment of the present disclosure, and is not repeated herein.

For example, in some embodiments of the present disclosure, a contact angle of each of the microstructures with a surface of the buffer layer is greater than 10 degrees.

For example, in some embodiments of the present disclosure, the plurality of microstructures include a plurality of raised structures, and the plurality of raised structures are arranged consecutively or spaced apart. For example, as shown in FIG. 5, FIG. 7 and FIG. 8, the plurality of raised structures 6 are arranged consecutively on the buffer layer 4 with a same distance between each other. For another example, as shown in FIG. 6, the plurality of raised structures 6 can also be spaced apart on the buffer layer 4, that is, the interval can be unequal.

For example, in some embodiments of the present disclosure, the plurality of raised structures are arranged regularly. For example, as shown in FIG. 5, FIG. 6, FIG. 7 and FIG. 8, the plurality of raised structures 6 are arranged regularly on the buffer layer in a specific direction, thereby converging light from a light source by the optical brightness enhancement structure. It should be noted that besides the arrangements as shown in FIG. 5, FIG. 6, FIG. 7 and FIG. 8, the raised structures can also be arranged regularly in other ways, and the arrangements are not limited in the embodiments of the present disclosure. In addition, in FIG. 5, FIG. 6, FIG. 7, and FIG. 8, the number of the raised structures 6 is merely schematic, and is not limited herein.

In the embodiments of the present disclosure, the specific shape of the raised structures can be set according to a required degree of optical brightness enhancement, the forming process of the microstructures, and the like, so as to improve the luminous efficiency of the light source.

For example, in some embodiments, as shown in FIG. 5 and FIG. 6, the raised structures 6 each can be a hemispheroidal structure. For example, in another embodiment, as shown in FIG. 7 and FIG. 8, the raised structures 6 each can also be a semi-cylindrical structure.

In the embodiments of the present disclosure, the raised structures each adopt the hemispheroidal structure or the semi-cylindrical structure, which is not only convenient for manufacturing the microstructures by the printing process or the coating process; meanwhile, compared with an edge of the light-gathering prism in contact with a foreign object, when an arc surface of the hemispheroidal structure or an arc surface of the semi-cylindrical structure is in contact with a foreign object, the hemispheroidal structure or the semi-cylindrical structure according to present embodiment bears a relatively small stress due to contact, and does not tend to be damaged when there is a contact. Compared with the light-gathering prism, the microstructures according to the embodiments of the present disclosure can avoid a problem of easy damage when there is a contact with the foreign object, and contributes to stabling the optical performance of the microstructures.

In order to conveniently assemble the optical brightness enhancement structure, in some embodiments of the present disclosure, as shown in FIG. 1, the optical brightness enhancement structure can further include an optical adhesive layer 2 on a second surface of the light-transmissive carrier 3 and an adhesive protective film 1 on a surface of the optical adhesive layer 2 away from the light-transmissive carrier 3.

For example, the optical adhesive layer 2 can be formed by OCA, and the adhesive protective film 1 can be formed by PET. When the optical brightness enhancement structure needs to be assembled, the adhesive protective film 1 is torn off, the optical adhesive layer 2 of the optical brightness enhancement structure is aligned with its assembled position; with the adhesive property of the optical adhesive layer 2, the optical brightness enhancement structure is adhered in the backlight module or other optical device requiring optical brightness enhancement. In this way, the optical brightness enhancement structure can be assembled more conveniently, thereby improving an assembled efficiency of the optical brightness enhancement structure.

The embodiment of the present disclosure further provides an electronic device 100, as shown in FIG. 9, including any optical brightness enhancement structure 10 according to the embodiments of the present disclosure.

For example, the electronic device 100 can be a display device. For example, this display device can be a liquid crystal panel, a liquid crystal television, a display, an OLED panel, an OLED television, an electronic paper, a mobile phone, a tablet computer, a digital photo frame, a navigator and other products or members having display function. The display device includes the optical brightness enhancement structure 10 according to the embodiment of the present disclosure, which can improve the display brightness, thereby increasing a light energy utilization rate of the light source and lowering display power consumption.

For another example, the electronic device 100 can also be a lighting device. For example, the lighting device can be used in a display device as a backlight source, thereby improving the luminous efficiency of the backlight source. It should be noted that the lighting device can also be the one for daily use, for example, an LED lighting device, a fluorescent lamp and a xenon lamp. The type of the lighting device is not limited in the embodiments of the present disclosure so long as a device which improves an illuminating brightness by adopting the optical brightness enhancement structure according to the embodiments of the present disclosure is used.

What have been described above are only specific implementations of the present disclosure, the protection scope of the present disclosure is not limited thereto. The protection scope of the present disclosure should be based on the protection scope of the claims.

What is claimed is:

1. A method for manufacturing an optical brightness enhancement structure, comprising:
   providing a light-transmissive carrier, and forming a buffer layer on a first surface of the light-transmissive carrier;
   forming a plurality of microstructures for converging light on a surface of the buffer layer away from the light-transmissive carrier; wherein surface energy of each of the microstructures is greater than surface energy of the buffer layer.

2. The method according to claim 1, wherein forming the plurality of microstructures for converging light on the surface of the buffer layer away from the light-transmissive carrier comprises:
   forming a plurality of liquid microstructures on the surface of the buffer layer away from the light-transmissive carrier by a printing process or a coating process; and
   curing the plurality of liquid microstructures to obtain the plurality of microstructures.

3. The method according to claim 2, wherein a material of the microstructures comprises a thermal curing material or an ultraviolet curing material;
   when the material of the microstructures is the thermal curing material, curing the plurality of liquid microstructures comprises: curing the plurality of liquid microstructures by a thermal curing process; or
   when the material of the microstructures is the ultraviolet curing material, curing the plurality of liquid microstructures comprises: curing the plurality of liquid microstructures by an ultraviolet curing process.

4. The method according to claim 1, wherein a contact angle of each of the microstructures with a surface of the buffer layer is greater than 10 degrees.

5. The method according to claim 1, wherein the plurality of microstructures comprise a plurality of raised structures, and the plurality of raised structures are arranged consecutively or spaced apart.

6. The method according to claim 5, wherein the plurality of raised structures are arranged regularly.

7. The method according to claim 5, wherein the raised structures each comprise a hemispheroidal structure or a semi-cylindrical structure.

8. The method according to claim 1, wherein forming the buffer layer on the first surface of the light-transmissive carrier comprises:

forming the buffer layer on the first surface of the light-transmissive carrier by a printing process, a coating process or a chemical vapor deposition process.

9. The method according to claim 1, further comprising:

forming an optical adhesive layer on a second surface of the light-transmissive carrier; and forming an adhesive protective film on a surface of the optical adhesive layer away from the light-transmissive carrier.

10. The method according to claim 1, wherein a viscosity of a material of the microstructures is less than 800 centipoise.

11. The method according to claim 1, wherein a material of the buffer layer comprises an organic material or an inorganic material.

12. The method according to claim 2, wherein the printing process comprises an inkjet printing process or a nozzle printing process, and the coating process comprises a slit coating process, a spray coating process or a dispensing process.

13. The method according to claim 1, wherein the buffer layer has a thickness of 10 nanometer to 1 millimeter, and the microstructures each have a thickness of 100 nanometer to 100 millimeter.

14. An optical brightness enhancement structure, comprising:

a light-transmissive carrier, and a buffer layer, on a first surface of the light-transmissive carrier, wherein a plurality of microstructures for converging light are on a surface of the buffer layer away from the light-transmissive carrier, and surface energy of each of the microstructures is greater than surface energy of the buffer layer.

15. The optical brightness enhancement structure according to claim 14, wherein a contact angle of each of the microstructures with a surface of the buffer layer is greater than 10 degrees.

16. The optical brightness enhancement structure according to claim 14, wherein the plurality of microstructures comprise a plurality of raised structures, and the plurality of raised structure are arranged consecutively or spaced apart.

17. The optical brightness enhancement structure according to claim 16, wherein the plurality of raised structures are arranged regularly.

18. The optical brightness enhancement structure according to claim 16, wherein the raised structures each comprise a hemispheroidal structure or a semi-cylindrical structure.

19. The optical brightness enhancement structure according to claim 14, further comprising:

an optical adhesive layer, on a second surface of the light-transmissive carrier, and an adhesive protective film, on a surface of the optical adhesive layer away from the light-transmissive carrier.

20. An electronic device, comprising the optical brightness enhancement structure according to claim 14.

* * * * *